United States Patent
Shen

[11] Patent Number: 5,855,160
[45] Date of Patent: Jan. 5, 1999

[54] TEA MAKER

[76] Inventor: Shun-Tsung Shen, P. O. Box 82-144, Taipei, Taiwan

[21] Appl. No.: 697,778

[22] Filed: Aug. 29, 1996

[51] Int. Cl.[6] .................................................. A47J 31/10
[52] U.S. Cl. ................................ 99/279; 99/299; 99/322
[58] Field of Search .............................. 99/279, 322, 317, 99/316, 299

[56] References Cited

U.S. PATENT DOCUMENTS

| 767,778 | 8/1904 | Vansant | 99/322 X |
| 1,143,239 | 6/1915 | Talbutt et al. | 99/317 |
| 4,785,723 | 11/1988 | Sheen | 99/299 X |

*Primary Examiner*—David Scherbel
*Assistant Examiner*—Reginald L. Alexander

[57] ABSTRACT

A tea maker including a pot having a top opening and a handle and a lid pivoted to the handle, and an infusion maker suspended in the pot, wherein the infusion maker includes a cup suspended in the pot and covered with a cover, a filter assembly mounted within the cup, a ball mounted in the bottom center hole of the cup and moved to control its passage, a ball lever having a fixed end connected to the ball, a middle part supported on the short upright support, and a plunger mounted in a locating member on the filter assembly and stopped above the free end of the ball lever and moved to turn the ball lever about the short upright support, causing the ball lever to lift the ball from the bottom center hole of the cup for letting tea to flow out of the cup.

3 Claims, 5 Drawing Sheets

TEA MAKER

BACKGROUND OF THE INVENTION

1. Field of the Invention

This invention relates to a tea maker, and relates more particularly to such a tea maker which comprises a pot, and a an infusion maker suspended in the pot and having bottom hole controlled by a ball through the operation of a plunger and a ball lever for letting prepared tea to be carried away from the cup to the pot.

2. Description of the Prior Art

When to prepare tea, a special equipment for example a tea maker shall be used so that a good taste of tea can be prepared from tea leaves. Regular tea makers commonly comprised of a pot, a cup suspending in the pot, and a wire gauze filter mounted in the top of the cup. These tea makers cannot keep tea leaves dipped in hot water but only allow hot water to pass throug tea leaves. Therefore, these tea makers cannot prepare a good taste of tea.

SUMMARY OF THE INVENTION

This invention relates to a tea maker, and relates more particularly to such a tea maker which comprises a pot, and a an infusion maker suspended in the pot and having bottom hole controlled by a ball through the operation of a plunger and a ball lever for letting prepared tea to be carried away from the cup to the pot.

It is one object of the present invention to provide a tea maker which is simple in structure and easy to operate. It is another object of the present invention to provide a tea maker which prepares tea by dipping tea leaves in hot water. According to the preferred embodiment of the present invention, the tea maker is comprised of a pot having a top opening and a handle and a lid pivoted to the handle, and an infusion maker suspended in the pot. The infusion maker is comprised of a cup suspended in the pot and covered with a cover, a filter assembly mounted within the cup, a ball mounted in the bottom center hole of the cup and moved to control its passage, a ball lever having a fixed end connected to the ball, a middle part supported on the short upright support, and a plunger mounted in a locating member on the filter assembly and stopped above the free end of the ball lever and moved to turn the ball lever about the short upright support, causing the ball lever to lift the ball from the bottom center hole of the cup for letting tea to flow out of the cup.

BRIEF DESCRIPTION OF THE DRAWINGS

FIG. 2A is a partial view in an enlarged scale of FIG. 2, showing the structure of the L-shaped mounting rod of the lid;

DETAILED DESCRIPTION OF THE PREFERRED EMBODIMENT

Figure 1:
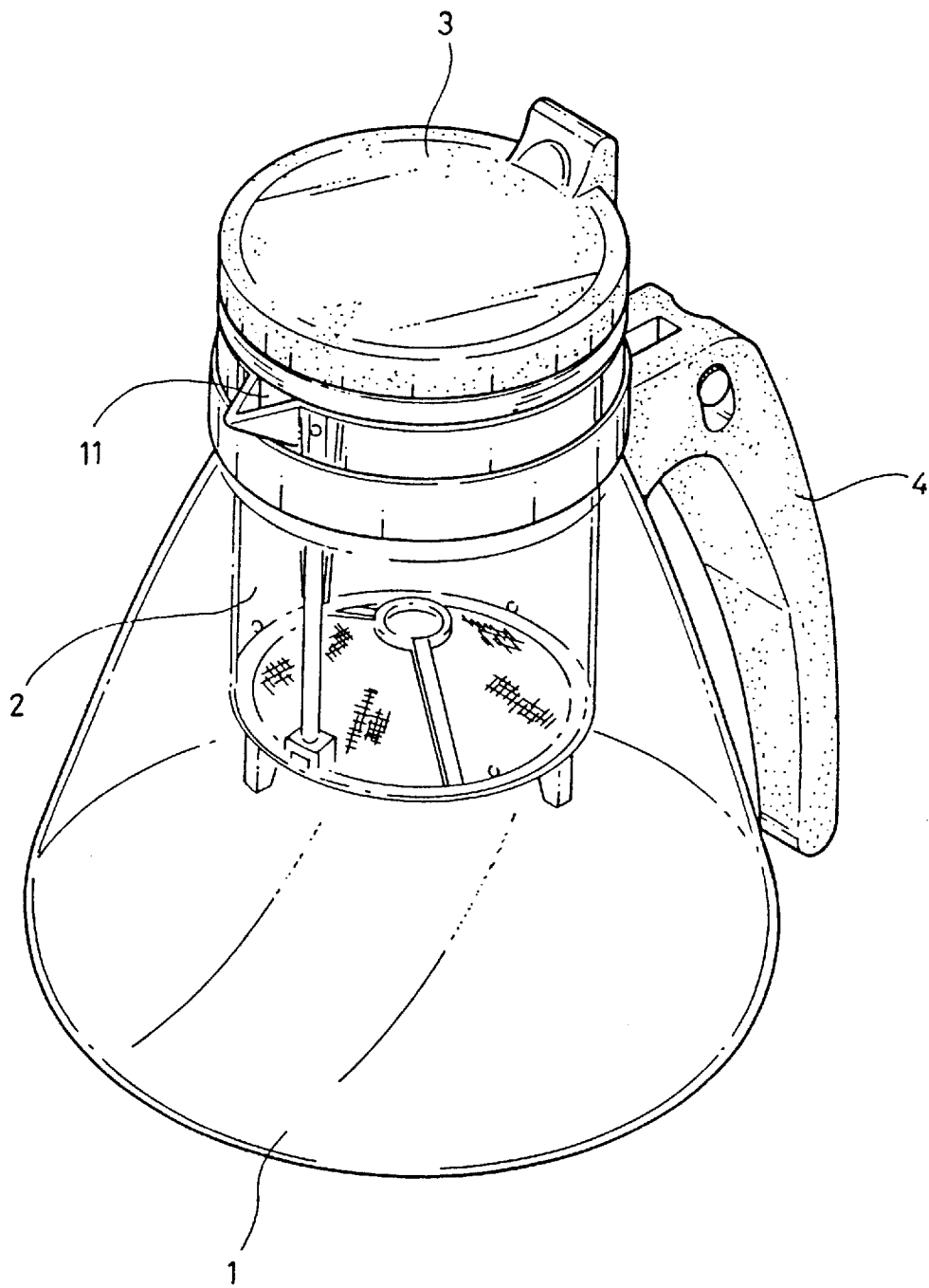
FIG. 1 is an elevational view of a tea maker according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
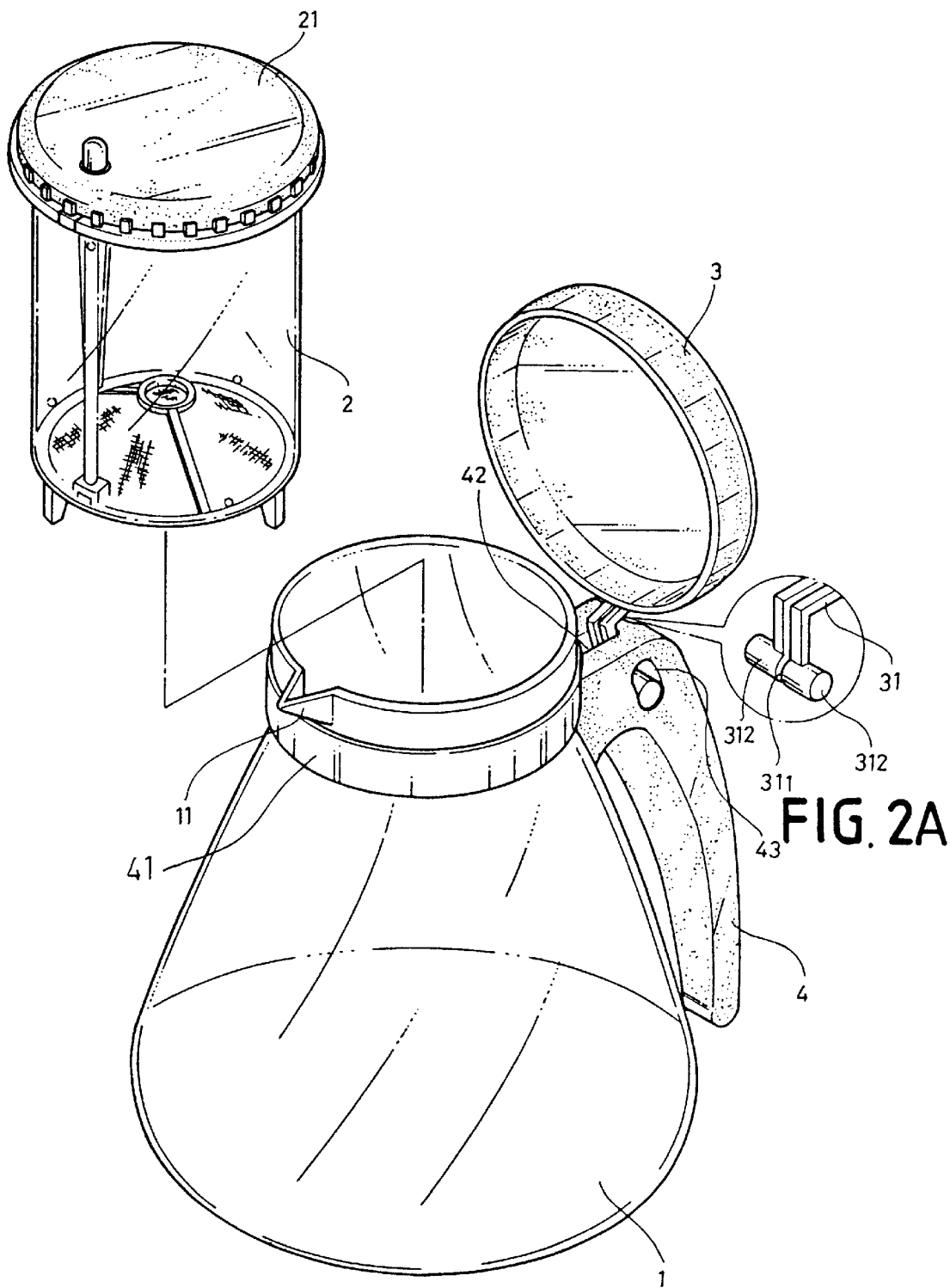
FIG. 2 shows the infusion maker removed out of the pot according to the present invention.

Referring to FIGS. 1 and 2, a tea maker in accordance with the present invention is generally comprised of a pot 1, an cup 2, a lid 3, and a handle 4. The pot 1 is a carafe having a spout 11 at the top open side thereof for carrying off tea. The handle 4 is fixedly fastened to the pot 1 near the top opposite to the spout 11. The lip 3 is pivoted to the handle 4 at the top and adapted for covering the top open side of the pot 1. The cup 2 is covered with a cover 21, and suspended in the pot 1. When the cup 2 is removed from the pot 1, it can be separately used for making tea.

Figure 3:
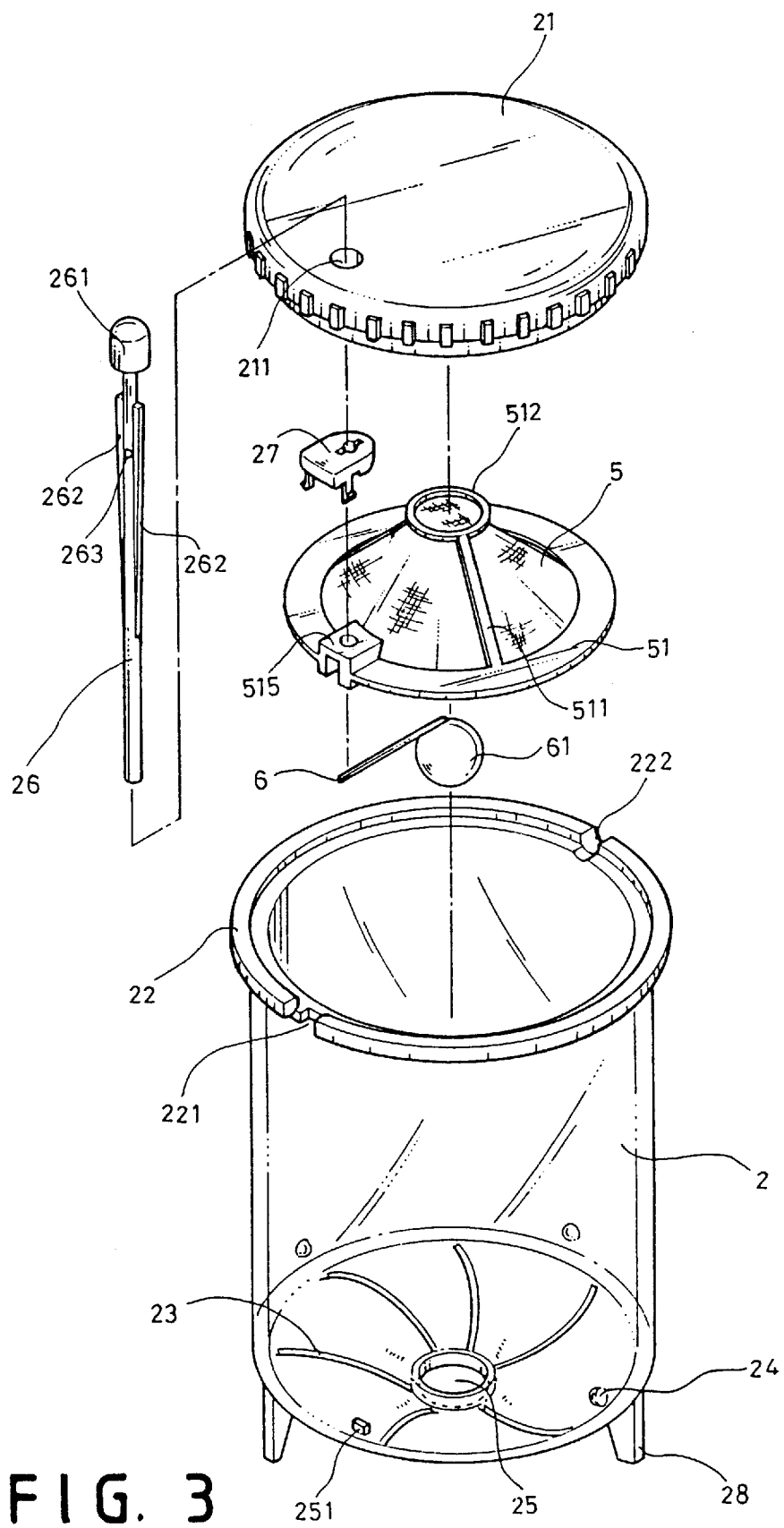
FIG. 3 is an exploded view of the infusion maker shown in FIG. 2.
Figures 4, 4A:
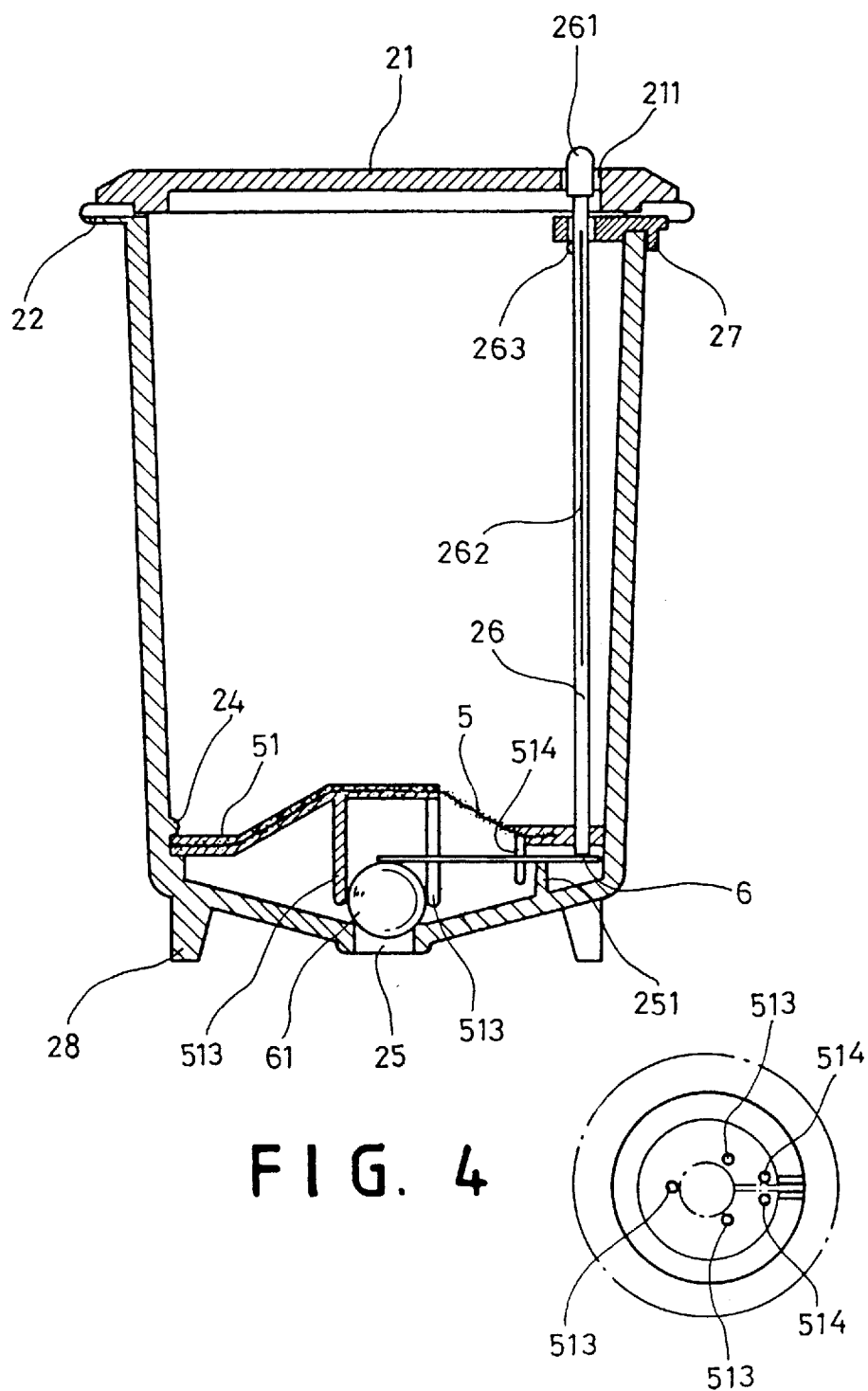
FIG. 4 is a sectional view of the infusion maker shown in FIG. 2.
FIG. 4A is a partial view in an enlarged scale of FIG. 4, showing the positions of the locating rods and the downward guide rods.

Referring to FIGS. 3 and 4, the cup 2 has a top flange 22 raised around the top opening thereof and adapted for mounting the cover 21, which has a through hole 211 adjacent to the border, a bottom hole 25 at the center of the bottom wall thereof, a plurality of smoothly curved grooves 23 disposed on the inside surface of the bottom wall and radially extending from the bottom hole 25, a plurality of raised portions 24 raised from the inside wall near the bottom and adapted for mounting a filter assembly 5, and a short upright support 251 raised from the bottom wall near the border. The smoothed curved grooves 23 are adapted to cause tea to turn quickly round and round when it flows downwards to the outside of the cup 2 through the bottom hole 25. The filter assembly 5 is shaped like a truncated cone supported on a frame, which comprises top ring 512 of smaller diameter, a bottom ring 511 of bigger diameter, an axle holder 515 formed in the bottom ring 51, a plurality of radial ribs 511 connected between the top ring 512 and the bottom ring 511, a plurality of equiangularly spaced locating rods 513 downwardly raised from the top ring 512, and two downward guide rods 514 downwardly raised from the bottom ring 51. When the filter assembly 5 is installed in the cup 2, the bottom ring 51 is forced into engagement with the raised portions 24. A ball 61 is mounted within the bottom hole 25 to block its passage, and fixedly mounted with a ball lever 6. The ball lever 6 is supported on the short upright support 251, having a fixed end fixedly connected to the periphery of the ball 61, and a free end inserted into the gap between the downward guide rods 514. A plunger 26 is inserted through the through hole 211 of the cover 21 and the axle holder 515 of the filter assembly 5 and stopped at the free end of the ball lever 6, having a knob 261 at the top disposed above the top side of the cover 21, two beveled ribs 262 longitudinally raised from the periphery at two opposite sides, and two raised portions 263 raised from the periphery and spaced between the beveled ribs 262 at two opposite sides. A locating member 27 is fastened to a notch 221 on the top flange 22 of the cup 2 and mounted around the plunger 26 and stopped between the raised portions 263 and the knob 261.

Referring to FIG. 2 again, the handle 4 has a coupling ring 41 fixedly mounted around the top end of the pot 1, a slot 42 at the top, and two transverse pivot holes 43 respectively communicating with the slot 42 at two opposite sides. The lid 3 has a substantially L-shaped mounting rod 31 raised from the periphery and inserted into the slot 42 of the handle 4, and two pivot pins 312 aligned at the end of the mounting rod 31 and spaced by a gap 311 and respectively turned in the pivot holes 43.

Figure 5:
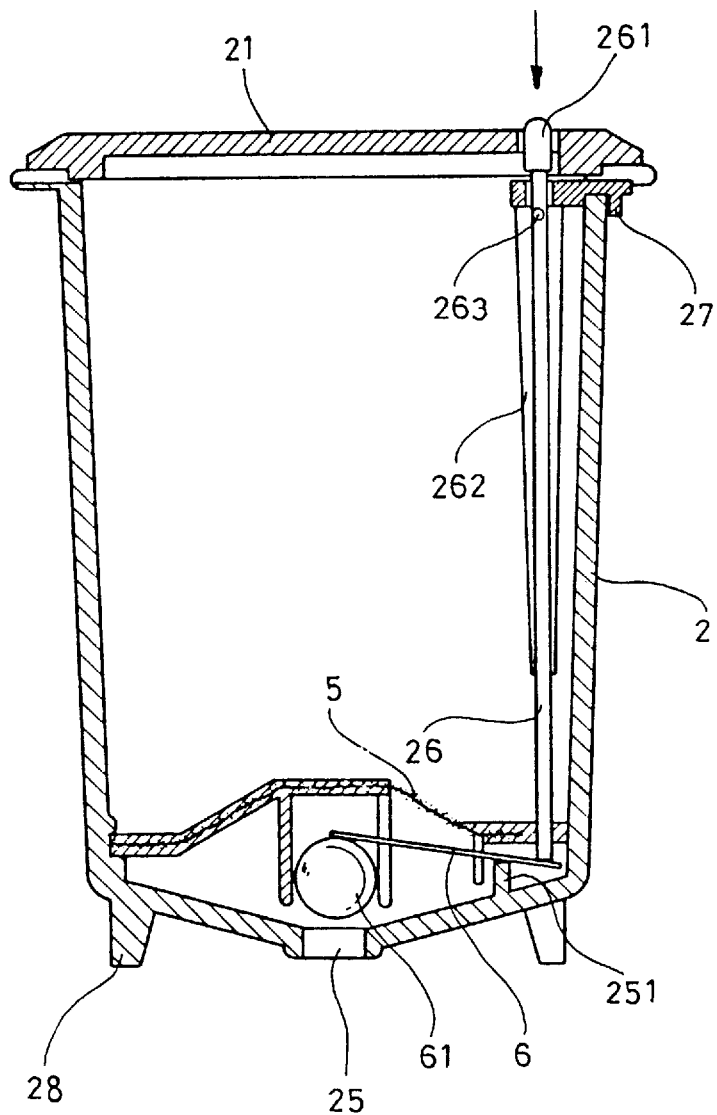
FIG. 5 is similar to FIG. 4 but showing the ball lifted from the bottom hole of the cup.

Referring to FIG. 5 and FIG. 3 again, the cup 2, the filter assembly 5, the plunger 26, and the cover 21 form an infusion maker. When tea is prepared, the lid 3 is lifted from the top open side of the pot 1, and then the knob 261 is depressed to force the plunger 26 downward, causing the ball lever 6 to turn about the fulcrum at the short upright support 251 and to lift the ball 61 from the bottom hole 25, permitting tea to flow out of the cup 2. When the plunger 26 is moved downwards, the beveled ribs 262 are forced into engagement with the locating member 27, causing the plunger 26 to be retained in the lower limit position in which the ball 61 is lifted from the bottom hole 25. Furthermore, an air vent 222 is made on the top flange 22 of the cup 2 for circulation of air so that tea can be smoothly drawn away from the cup 2 through the bottom hole 25. When tea is completely drawn away from the cup 2, the cup 2 can be removed out of the pot 1. The cup 2 has a plurality of legs 28 equiangularly spaced at the bottom. By means of the legs 28, the cup 2 can stand firm on the cover 21 when the cover 21 is turned upside down and placed on the table.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A tea maker comprising a pot having a top opening and a handle and a lid pivoted to said handle, and an infusion maker suspended in said pot, wherein:

said infusion maker comprises:

a cup, said cup comprising top flange raised around a top opening thereof and supported above the top opening of said pot, a bottom hole at the center of a bottom wall thereof, a plurality of smoothly curved grooves disposed on said bottom wall on the inside and radially extending from said bottom hole, a plurality of raised portions raised from the inside of a peripheral wall thereof near said bottom wall, a short upright support raised from said bottom wall near the border;

a cover covered on the top opening of said cup;

a filter assembly mounted inside said cup, said filter assembly comprising a top ring of smaller diameter, a bottom ring of bigger diameter forced into engagement with the raised portions of said cup, an axle hole formed in said bottom ring, a plurality of radial ribs connected between said top ring and said bottom ring, a plurality of equiangularly spaced locating rods downwardly raised from said top ring, and two downward guide rods downwardly raised from said bottom ring;

a ball mounted within the bottom hole of said cup and moved to control its passage;

a ball lever having a fixed end fixedly connected to the periphery of said ball, a middle part supported on the short upright support of said cup, and a free end inserted into the gap defined between the downward guide rods of said filter assembly and moved to lift said ball from the bottom hole of said cup;

a plunger having a top end terminating in a knob, a bottom end inserted through the axle holder of said filter assembly and stopped above the free end of said ball lever, two beveled ribs longitudinally raised from the periphery at two opposite sides, and two raised portions raised from the periphery and spaced between said beveled ribs at two opposite sides; and a locating member fastened to a notch on the top flange of said cup and mounted around said plunger and stopped between the raised portions and knob of said plunger, said locating member holding said plunger in a lower limit position when said knob is depressed to force said plunger downwards and to cause said ball lever to lift said ball from the bottom hole of said cup;

the handle of said pot has a slot at a top side thereof, and two transverse pivot holes respectively communicating with said slot at two opposite sides;

the lid of said pot has a substantially L-shaped mounting rod raised from the periphery and inserted into the slot of said handle, and two pivot pins aligned at one end of said mounting rod and spaced by a gap and respectively turned in the pivot holes of said handle.

2. The tea maker as claimed in claim 1 wherein the cover of said infusion maker has a through hole near the border for the passing of the plunger of said infusion maker.

3. The tea maker as claimed in claim 1 wherein said cup of said infusion maker has a vent formed in the top flange thereof.

* * * * *